(12) United States Patent
Huang

(10) Patent No.: US 10,789,946 B2
(45) Date of Patent: Sep. 29, 2020

(54) SYSTEM AND METHOD FOR SPEECH RECOGNITION WITH DECOUPLING AWAKENING PHRASE

(71) Applicant: BEIJING DIDI INFINITY TECHNOLOGY AND DEVELOPMENT CO., LTD., Beijing (CN)

(72) Inventor: Chen Huang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/729,258

(22) Filed: Dec. 27, 2019

(65) Prior Publication Data

US 2020/0135186 A1    Apr. 30, 2020

Related U.S. Application Data

(63) Continuation of application No. PCT/CN2017/107451, filed on Oct. 24, 2017.

(51) Int. Cl.
*G10L 15/197*    (2013.01)
*G10L 15/02*    (2006.01)
(Continued)

(52) U.S. Cl.
CPC ............ *G10L 15/197* (2013.01); *G10L 15/02* (2013.01); *G10L 15/18* (2013.01); *G10L 15/183* (2013.01);
(Continued)

(58) Field of Classification Search
CPC ... G10L 15/26; G10L 2015/088; G10L 15/18; G10L 15/183
See application file for complete search history.

(56) References Cited

U.S. PATENT DOCUMENTS 5,842,163 A  *  11/1998  Weintraub ............ G10L 15/10
                                                         704/240
8,401,841 B2      3/2013  Roitblat et al.
(Continued)

FOREIGN PATENT DOCUMENTS

CN           102999161 A       3/2013
CN           103810998 A       5/2014
(Continued)

OTHER PUBLICATIONS

International Search Report in PCT/CN2017/107451 dated Jul. 25, 2018, 4 pages.
Written Opinion in PCT/CN2017/107451 dated Jul. 25, 2018, 3 pages.
Zhu Jia, GMM Based Connected Digits Speech Recognizer and the State of the Art of Language Modeling for Large Vocabulary Speech Recognizer, China Master's Theses Full-text Database, 2006, 75 pages.
(Continued)

*Primary Examiner* — Samuel G Neway
(74) *Attorney, Agent, or Firm* — Metis IP LLC

(57) ABSTRACT

Systems and methods are provided for speech recognition. An example method may be implementable by a server. The method may comprise adding a key phrase into a dictionary comprising a plurality of dictionary phrases, and for each one or more of the dictionary phrases, obtaining a first probability that the dictionary phrase is after the key phrase in a phrase sequence. The key phrase and the dictionary phrase may each comprise one or more words. The first probability may be independent of the key phrase.

19 Claims, 6 Drawing Sheets

(51) Int. Cl.
*G10L 15/187* (2013.01)
*G10L 15/22* (2006.01)
*G10L 15/30* (2013.01)
*G10L 15/183* (2013.01)
*G10L 15/18* (2013.01)
*G10L 15/26* (2006.01)
*G10L 15/08* (2006.01)

(52) U.S. Cl.
CPC ............ *G10L 15/187* (2013.01); *G10L 15/22* (2013.01); *G10L 15/26* (2013.01); *G10L 15/30* (2013.01); *G10L 2015/025* (2013.01); *G10L 2015/088* (2013.01)

(56) References Cited

U.S. PATENT DOCUMENTS

| | | | |
|---|---|---|---|
| 9,165,556 B1 | 10/2015 | Sugar et al. | |
| 9,934,777 B1* | 4/2018 | Joseph | G10L 15/063 |
| 2003/0220792 A1 | 11/2003 | Kobayashi et al. | |
| 2009/0265171 A1 | 10/2009 | Davis | |
| 2016/0267913 A1* | 9/2016 | Kim | G10L 15/30 |
| 2017/0148444 A1 | 5/2017 | Bocklet et al. | |
| 2017/0236512 A1* | 8/2017 | Williams | G10L 15/22 381/79 |
| 2018/0233150 A1* | 8/2018 | Gruenstein | G10L 15/32 |
| 2018/0293974 A1* | 10/2018 | Georges | G10L 15/183 |
| 2019/0278843 A1 | 9/2019 | Bao et al. | |

FOREIGN PATENT DOCUMENTS

| | | |
|---|---|---|
| CN | 103871403 A | 6/2014 |
| CN | 105206263 A | 12/2015 |
| JP | 2000075885 A | 3/2000 |

OTHER PUBLICATIONS

Bahrani M. et al., A New Word Clustering Method for Building N-Gram Language Models in Continuous Speech Recognition Systems, New Frontiers in Applied Artificial Intelligence: 21st International Conference on Industrial, Engineering and Other Applications of Applied Intelligent Systems, IEA/AIE 2008: New Frontiers in Applied Artificial Intelligence, 5027(1): 286-293, 2008.

First Office Action in Chinese Application No. 201780091695.0 dated Apr. 24, 2020, 11 pages.

Notification to Grant Patent Right in Chinese Application No. 201780091695.0 dated Jun. 19, 2020, 7 pages.

* cited by examiner

SYSTEM AND METHOD FOR SPEECH RECOGNITION WITH DECOUPLING AWAKENING PHRASE

CROSS-REFERENCE TO RELATED APPLICATIONS

This application is a continuation of International Application No. PCT/CN2017/107451, filed on Oct. 24, 2017, the contents of which are incorporated herein by reference to its entirety.

FIELD OF THE INVENTION

This disclosure generally relates to approaches and techniques for speech recognition.

BACKGROUND

Advances in technologies allow users to use their voices to effectuate control. For example, command input via keyboard, mouse, or touch screen for triggering various applications or functions can be achieved with speech. Nevertheless, many hurdles are yet to overcome to improve the accuracy for recognizing the speech.

SUMMARY

Various embodiments of the present disclosure include systems, methods, and non-transitory computer readable medium for speech recognition. An example method may be implementable by a system for speech recognition, such as a server. The method may comprise adding a key phrase into a dictionary comprising a plurality of dictionary phrases, and for each one or more of the dictionary phrases, obtaining a first probability that the dictionary phrase is after the key phrase in a phrase sequence. The key phrase and the dictionary phrase may each comprise one or more words. The first probability may be independent of the key phrase.

In some embodiments, the method is applicable to a language model for speech recognition, and the language model comprises a N-gram model. N may be a natural number larger than 1.

In some embodiments, the phrase sequence may start with the key phrase and comprise N−1 other dictionary phrases after the key phrase, the N−1 other dictionary phrases may comprise and end with a first dictionary phrase, and the first probability of the first dictionary phrase may depend on one or more dictionary phrases preceding the first dictionary phrase in the phrase sequence and not depend on the key phrase.

In some embodiments, the phrase sequence may start with the key phrase and comprise a second dictionary phrase after the key phrase, and the first probability of the second dictionary phrase may depend on starting a sentence with the second dictionary phrase and not depend on the key phrase.

In some embodiments, before obtaining the first probability, the method may further comprise, for the key phrase, obtaining a second probability associated with starting the phrase sequence with the key phrase. The second probability may be larger than another probability of starting the phrase sequence with another dictionary phrase.

In some embodiments, the key phrase and the dictionary phrases may be associated with a linguistic model, each linguistic model associating the phrase with one or more pronunciation elements of the phrase.

In some embodiments, the exemplary method may further comprise obtaining an audio recording comprising the key phrase and one or more dictionary phrases after the key phrase, recognizing the key phrase and determining one or more candidate dictionary phrases based at least on the linguistic model, and determining the one or more dictionary phrases, in a temporal order in the audio recording, from the one or more candidate dictionary phrases based at least on the language model. For each of the key phrase and dictionary phrases, the pronunciation elements may comprise one or more phonemes.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
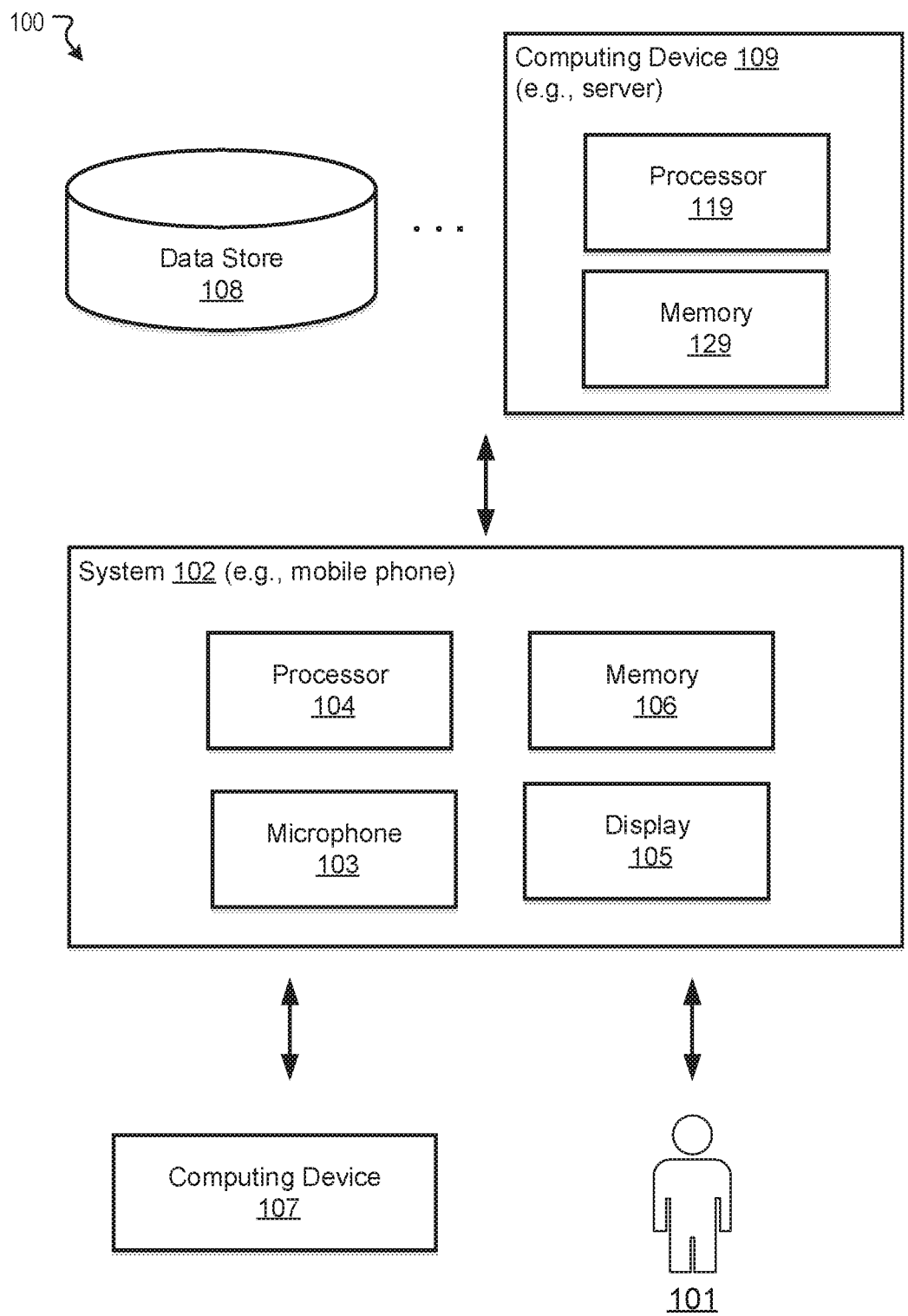
FIG. 1 illustrates an example environment for speech recognition, in accordance with various embodiments.

Under some approaches, speech recognition enables the recognition and translation of audio signals of spoken languages and phrases into texts by machines such as computers or servers. The machines may use a speech decoder to identify the most matching texts (e.g., a sequence of phrases with the highest probability score). This condition can be expressed as W=arg max P(W|X), which can be further converted to W=arg max P(X|W)P(W). Here, an acoustic model may be applied to obtain P(X|W), the probability that speaking the phrase sequence $W=W_1 W_2 \ldots$ would result in the data (feature vector sequence) $X=X_1 X_2 \ldots$ audio signal X given by some determined text W. Further, a language model may be applied to obtain P(W), the probability that a person might actually utter the phrase sequence $W=W_1 W_2 \ldots$ . The sequence of $W=W_1 W_2 \ldots$ which maximizes both P(X|W) and P(W) can yield the highest probability score and thus a machine-recognized speech corresponding to the audio signal. The acoustic and language models can be trained with data such as human speech recordings and/or feedback speech recognition results from the acoustic and language models (whether correct or incorrect).

In principle, to obtain W of an audio recording of a speech, the machine may first apply the acoustic model (e.g., Viterbi Model, Hidden Markov Model). The acoustic model may have been trained to represent the relationship between the audio recording of the speech and phonemes or other linguistic units that make up the speech, thus relating the audio recording to word or phrase candidates. The training may feed the acoustic model with sample pronunciations with labelled phonemes, so that the acoustic model can identify phonemes from audios. The machine may dynamically determine the start and end for each phoneme in the audio recording and extract features (e.g., character vectors) to generate speech fingerprints. The machine may compare the generated speech fingerprints with a phrase fingerprint template to select the most matching word or phrase candidates. The phrase fingerprint template may comprise the mapping between the written representations and the pronunciations of words or phrases. Thus, one or more sequence candidates comprising various combinations of words or phrases may be obtained.

Further, the machine may apply a language model to the one or more sequence candidates. The language model represents a probability distribution over a sequence of phrase, each determined from the acoustic model. The machine may compare the selected words or phrases in the candidate sequences with a sentence fingerprint template (e.g., a grammar and semantics model) to select the most matching sentence. This step can distinguish between words and phrases that sound similar and make sure W complies with grammar. For example, the phrases "recognize speech" and "wreck a nice beach" may be pronounced similarly but carry very different meanings. For another example, "get me a peach" and "give impeach" may be pronounced similarly but the latter is not grammatically sound. In some embodiments, the probability score of a phrase sequence (e.g., a sentence) can be expressed as a chain product of probabilities of all phrases in the sequence. In particular, a N-gram model can be used as the language model, where the probability of a phrase in a sentence depends on the probability of N−1 preceding phrases. The N-gram model may assume that phrases further apart may have weaker associations and excessive computing may be unnecessary. For example, for a phrase sequence comprising phrases <s>w1 w2 w3 w4</s>, the probability of observing the phrase sequence (e.g., an overall probability score of the recognized sentence) is P(w1 w2 w3 w4)=P(w1|<s>)P(w2|<s>w1)P (w3|<s>w1 w2)P(w4|<s>w1 w2 w3)P(</s>|<s>w1 w2 w3 w4), where <s> and </s> may represent stops or pauses at the start and end of a phrase sequence and may be optional to include in the probability determination. Applying a 2-gram model, P(w1 w2 w3 w4)=P(w1|<s>)P(w2|w1)P (w3|w2)P(w4|w3)P(</s>|w4).

In various embodiments of voice control, to use a speech to trigger certain application (e.g., a program, function, process, mobile phone application, robot module, etc.), a user may first utter a key phrase (e.g., a preset word, phrase, sentence, etc.) associated with the application to a machine. The key phrase may be an awakening phrase for awaken a software application. Before the application being triggered, the machine may be constantly capturing an audio in a streaming file and scanning the file for the key phrase. In the example of a sentence <s>w1 w2 w3 w4</s>, w1 may be a key phrase, and w2-w4 which come right after w1 may be a query (e.g., a command that the user requested to be performed). In a more specific example, a user may say, "XYZ, order a pizza delivery." Here, "order a pizza delivery" is the query, and "XYZ" is the key phrase associated with the application. After obtaining the audio "XYZ, order a pizza delivery" and being triggered by the key phrase "XYZ," the application may be configured to implement the pizza ordering. However, in recognizing the sentence "XYZ, order a pizza delivery" including the key phrase "XYZ," the application of the traditional language model such as the 2-gram model described above may cause an inaccurate determination ("XYZ" can be another phrase, an application brand name, or any makeup phrase). For example, though probabilities such as P(delivery|pizza) may be accurately determined because "pizza delivery" is commonly used and likely to have been used to train the language model, other probabilities such as P(order|XYZ) may be inaccurate because "XYZ order" is uncommon and unlikely to have been used to train the language model. Thus, the overall probability P(XYZ, order a pizza delivery) would be lowered by P(order|XYZ), causing the speech recognition result W to differ from "XYZ, order a pizza delivery."

A claimed solution rooted in computer technology can overcome problems specifically arising in the realm of speech recognition. The embodiments described herein can be implemented by one or more systems or devices, such as a server comprising a processor and a non-transitory computer-readable storage medium. The storage medium may store instructions that, when executed by the processor, cause the processor to perform a method. The method may comprise adding a key phrase into a dictionary comprising a plurality of dictionary phrases, and for each one or more of the dictionary phrases, obtaining a first probability that the dictionary phrase is after the key phrase in a phrase sequence. The dictionary may be stored in the storage medium or otherwise accessible to the server. The key phrase and the dictionary phrase may each comprise one or more words. The first probability may be independent of the key phrase.

In some embodiments, the method is applicable to a language model for speech recognition, and the language model comprises a N-gram model. N may be a natural number larger than 1. The phrase sequence may start with the key phrase and comprise N−1 other dictionary phrases after the key phrase, the N−1 other dictionary phrases may comprise and end with a first dictionary phrase, and the first probability of the first dictionary phrase may depend on one or more dictionary phrases preceding the first dictionary phrase in the phrase sequence and not depend on the key phrase.

In some embodiments, the phrase sequence may start with the key phrase and comprise a second dictionary phrase after the key phrase, and the first probability of the second dictionary phrase may depend on starting a sentence with the second dictionary phrase and not depend on the key phrase.

In some embodiments, before obtaining the first probability, the method may further comprise, for the key phrase, obtaining a second probability associated with starting the phrase sequence with the key phrase. The second probability may be larger than another probability of starting the phrase sequence with another dictionary phrase.

In some embodiments, the key phrase and the dictionary phrases may be associated with a linguistic model, each linguistic model associating the phrase with one or more pronunciation elements of the phrase.

In some embodiments, the exemplary method may further comprise obtaining an audio recording comprising the key phrase and one or more dictionary phrases after the key phrase, recognizing the key phrase and determining one or more candidate dictionary phrases based at least on the linguistic model, and determining the one or more dictionary phrases, in a temporal order in the audio recording, from the one or more candidate dictionary phrases based at least on the language model. For each of the key phrase and dictionary phrases, the pronunciation elements may comprise one or more phonemes.

In some embodiments, the disclosed systems and methods may be applied to various platforms (e.g., a vehicle hailing platform). For example, to order a vehicle service for transportation, a user can speak to a mobile phone to submit a key phrase and a query (e.g., "XYZ, get me a ride to metro center"). Based on the disclosed system, the mobile phone transmit "XYZ, get me a ride to metro center" to a computing system or device (e.g., a server). The server may recognize key phrase "XYZ" and the query "get me a ride to metro center" based on a linguistic and a language model. The server may further determine an address corresponding to "metro center" and a vehicle to implement this transportation and transmit corresponding information to the mobile phone. Accordingly, the mobile phone can display an indication of an acceptance of the transportation request to "metro center," information of the vehicle, and arrangement for pick-up. The systems and methods disclosed herein can be applied to various languages, with appropriate training of samples in the corresponding languages.

FIG. 1 illustrates an example environment 100 for speech recognition, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described with respect to the system 102. The system 102 may further comprise a microphone 103 configured to capture audio inputs (e.g., human speeches or voices). The audio inputs may be captured from a computing device 107 or a user 101. The computing device 107 (e.g., cellphone, tablet, computer, wearable device (smart watch)) may transmit and/or play information (e.g., a recorded audio) to the system 102. The user 101 may speak within the detection range of the microphone 103 for audio capture. Optionally, the system 102 may further comprise a display 105 configured to display information (e.g., texts of recognized speeches). The display 105 may comprise a touch screen. The system 102 may be implemented on or as various devices such as cellphone, tablet, computer, wearable device (smart watch), etc. The system 102 above may be installed with appropriate software (e.g., Application, platform program, etc.) and/or hardware (e.g., wires, wireless connections, etc.) to access other devices of the environment 100.

The environment 100 may include one or more data stores (e.g., a data store 108) and one or more computing devices (e.g., a computing device 109) that are accessible to the system 102. In some embodiments, the data store 108 and/or the computing device 109 may be configured to exchange data or information with the system 102. For example, the data store 108 may be installed in a computer for storing address information. The computing device 109 may be a server configured to perform speech recognition. The computing device 109 may comprise one or more processors 119 and a memory 129. The memory 129 may be a non-transitory and computer-readable storage medium. The memory 129 may store instructions that, when executed by the one or more processors 119, cause the one or more processors 119 to perform various methods or steps described herein for speech recognition. In various embodiments, the computing device 109 may be configured to receive an audio (e.g., from the system 102, from the data store 108, from another computer or server, etc.) and apply various models to recognize the speech corresponding to the audio and obtain corresponding texts.

In some embodiments, the data store 108 and/or the computing device 109 may implement an online information or service platform. The service may be associated with vehicles (e.g., cars, bikes, boats, airplanes, etc.), and the platform may be referred to as a vehicle service hailing platform. The platform may accept requests for transportation, identify vehicles to fulfill the requests, arrange for pick-ups, and process transactions. For example, a user may use the system 102 (e.g., a mobile phone installed with an Application associated with the platform) to access the platform. Some platform data (e.g., vehicle information, vehicle driver information, address information, etc.) may be stored in the memory 129 or the memory 106 or retrievable from the data store 108. In some embodiments, the user may speak to the system 102 to submit a request (e.g., a vehicle hailing voice request). As described herein, the data store 108 and/or the computing device 109 may work together to obtain and recognize a speech corresponding to the voice and process based on the recognized speech to fulfill the request.

In some embodiments, the system 102 and one or more of the computing devices (e.g., the computing device 109) may be integrated in a single device or system. Alternatively, the system 102 and the computing devices may operate as separate devices. The data store(s) may be anywhere accessible to the system 102, for example, in the memory 106, in the memory 129, in another device (e.g., network storage device) coupled to the system 102, or another storage location (e.g., cloud-based storage system, network file system, etc.), etc. Although the computing device 109 is shown as a single component in this figure, it is appreciated that the computing device 109 can be implemented as a single device or multiple devices (e.g., computers, servers, etc.) coupled together. The computing device may couple to and interact with multiple systems like the system 102. In general, the system 102, the computing device 109, and the data store 108 may be able to communicate with one another through one or more wired or wireless networks (e.g., the Internet) through which data can be communicated. Various aspects of the environment 100 are described below in reference to FIG. 2 to FIG. 5.

Figure 2:
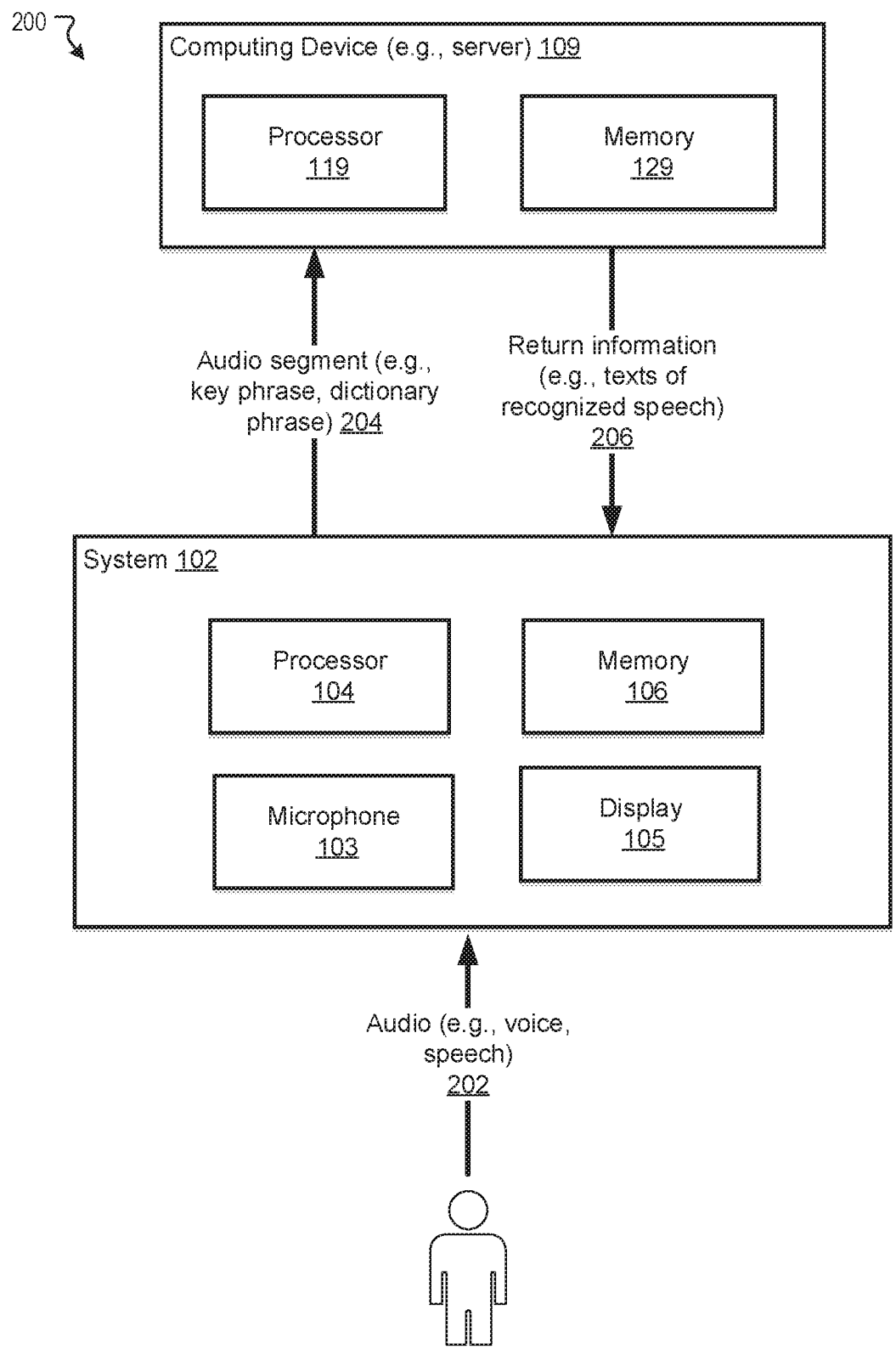
FIG. 2 illustrates an example system for speech recognition, in accordance with various embodiments.

FIG. 2 illustrates an example system 200 for speech recognition, in accordance with various embodiments. The operations shown in FIG. 2 and presented below are intended to be illustrative. The various devices and components in FIG. 2 are similar to those described in FIG. 1, except that the data store 108 and the computing device 107 are removed for simplicity.

In various embodiments, the system 102 may be implemented on a mobile device including a mobile phone. One or more components of the system 102 (e.g., the microphone 108, the processor 104, and/or the memory 106) may be configured to record an audio (e.g., audio 202). The audio 202 may comprise a speech (e.g., sentences, phrases sequences) spoken by a human. The speech can be in any language. The processor 104 may be configured to control the start and stop of the recording. For example, when entering a preset interface of an Application on the mobile device or opening the Application, the recording may start. The processor 104 may control an analogue to digital signal converter (ADC) of the system 102 (not shown in this figure) to convert the captured audio into digital format and store in an audio queue. The audio queue may be associated with time and may comprise time-series data of the captured audio. The audio queue may be stored in various audio file formats (e.g., a WAV file). The audio queue may be stored in the memory 106, in a cache, or another storage medium.

In some embodiments, the computing device 109 may be implemented as one or more servers. The computing device 109 may be configured to obtain at least a portion of the audio queue (e.g., an audio segment 204) from the system 102. Alternatively, if the portion of audio queue is stored in another system or device (e.g., the data store 108), the computing device 109 may obtain from the corresponding location. In one example, while recording the audio, the system 102 may monitor the audio queue for an awakening phrase, obtain an audio segment comprising the awakening phrase and a query following the awakening phrase from the audio queue in response to detecting the awakening phrase, and transmit the obtained audio segment (e.g., the audio segment 204) to the computing device 109. Accordingly, the computing device 109 obtains the audio segment from the system 102.

The awakening phrase may be a type of the key phrase described herein. In various embodiments, the awakening phrase can comprise one or more words. The awakening phrase and other phrases uttered by a user after the awakening phrase may be considered as a part of the speech spoken by the user in the user's voice. The awakening phrase can have various forms. For example, the awakening phrase may comprise a name or greeting (e.g., "Hello XYZ") and may be associated with an application, a preset program, function, or process (e.g., application XYZ). In some embodiments, the system 102 may, upon detecting the awakening phrase in the audio queue, trigger steps to obtain the audio segment. Here, "awakening" does not necessarily imply awakening from a "sleeping mode." Before awakening, the system 102 may be sleeping, idle, or performing other tasks.

In some embodiments, the computing device 109 may be configured to perform speech recognition on the audio segment 204. The audio segment 204 may comprise the awakening phrase or another key phrase. More details of the speech recognition with decoupling awakening phrase are described below with reference to FIGS. 3A-3B, and as discussed below, the decoupling can at least improve the accuracy of the speech recognition. Once the speech recognition performed, the computing device 109 may be configured to return information 206 (e.g., texts of recognized speech) to the system 102 at least based on the speech recognition results. The display 105 of the system 102 may be configured to display the returned information. The returned information may comprise texts of a machine-recognized speech corresponding to the audio segment. The texts may be displayed while the recording is being streamed and the speech recognition is being performed.

Figure 3A:
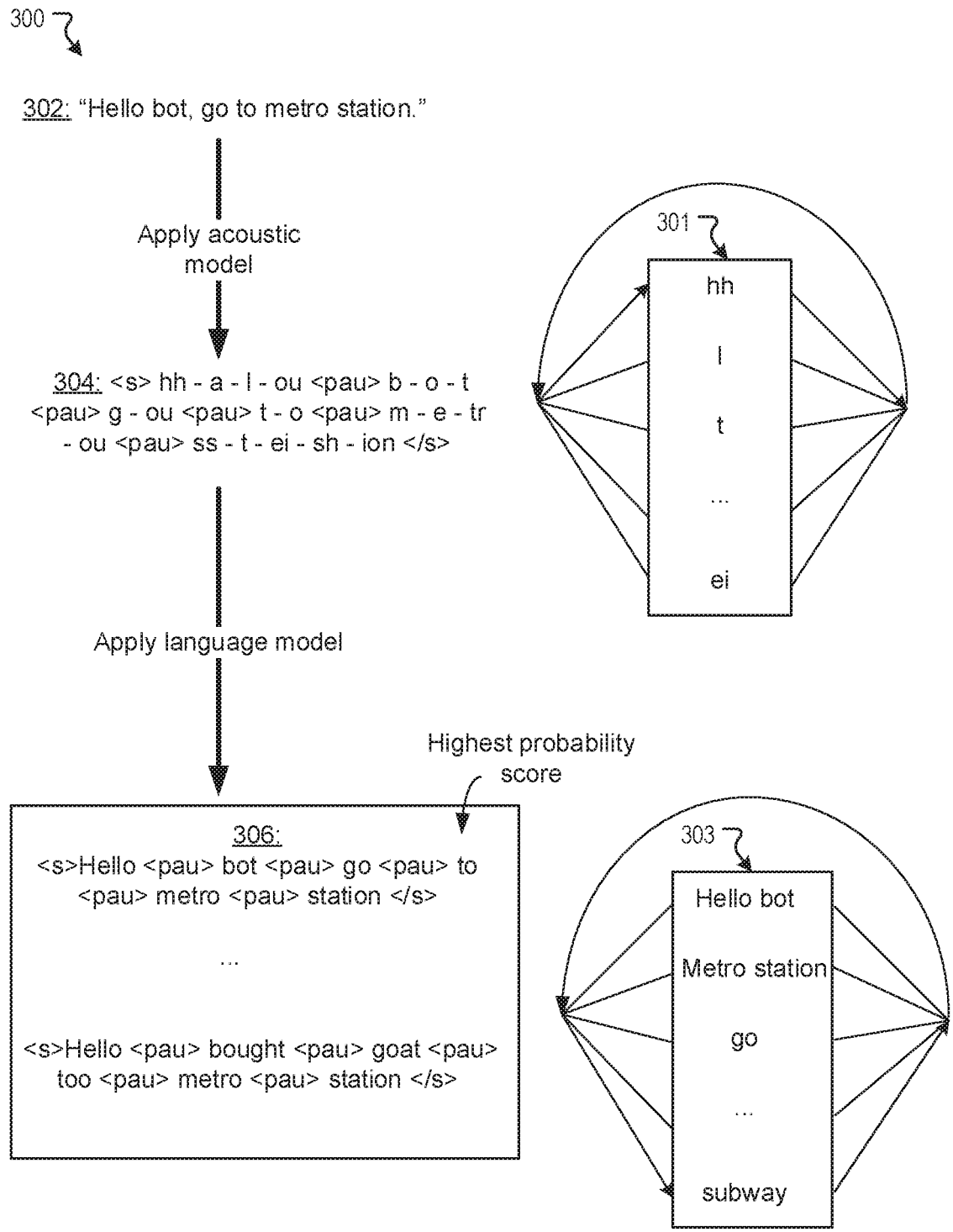
FIGS. 3A-3B illustrate example methods for speech recognition, in accordance with various embodiments.

FIG. 3A illustrates an example method 300 for speech recognition, in accordance with various embodiments. The method 300 may be implemented in various environments including, for example, the environment 100 of FIG. 1. The various steps discussed with reference to FIG. 3A may be implemented by one or more components of the computing device 109 (e.g., the processor 119 and/or the memory 129). The description of FIG. 3A is intended to be illustrative and may be modified in various ways according to the implementation. For FIG. 3A, "hello bot" is assumed to be the key phrase.

Before implementing the method 300, one or more components of the computing device 109 (e.g., the processor 119 and/or the memory 129) may add a preset key phrase (e.g., "Hello bot") into a dictionary (e.g., dictionary 302) comprising a plurality of dictionary phrases (e.g., "metro station," "go," etc.), and for each one or more of the dictionary phrases, obtaining a first probability that the dictionary phrase is after the key phrase in a phrase sequence. The key phrase and the dictionary phrase may each comprise one or more words. The dictionary may be stored in the memory 129 or otherwise accessible to the computing device 109. The dictionary may be a collection of phrases that appear in human speeches. The dictionary may be a part of a language described below. For example, the collection of phrases may have been added to the dictionary based on a training data set comprising human speech phrases. The training data set may comprise real, frequently used, and/or grammatical sample speeches. When training by the training data set, the language model may extract rules for phrase sequences that are consistent with the training data set. After being test for accuracy, a trained language model can assign probabilities to phrases with respect to one or more preceding and/or following phrases in various phrase sequences.

In some embodiments, each phrase in the dictionary may have a probability with respect to one or more other dictionary phrases. For example, the probability of "go" with respect to "walkie talkie" is P(go|walkie talkie), the probability of "go" with respect to "let" is P(go|let), the probability of "go" with respect to "walkie talkie" and "let" is P(go|walkie talkie let). As discussed earlier in this disclosure, the representation P(B|A) represents the probability of having phrase "B" in a phrase sequence "AB." The probability of a phrase may be assumed to depend only on the phrases preceding it, and in a N-gram model, the probability of a phrase may be assumed to depend only on N−1 phrases immediately preceding it. For example, P(go|let) is 2-gram, and P(go|walkie talkie let) is 3-gram. The dictionary phrases may be trained with the training data set to obtain the probabilities. Since the training data set may be common human speech phrases, P(go|let) may be high because "let go" is commonly used, but P(go|walkie talkie) may be low because "walkie talkie go" is not commonly used.

In some embodiments, the first probability may refer to the probability that the dictionary phrase is after the key phrase in a phrase sequence, and the first probability may be independent of the key phrase. That is, any dictionary phrase's first probability is independent of the key phrase. For example, for the phrase sequence of "hello bot, take me to metro station" in a modified 2-gram model, including P(go|hello bot) in the speech recognition for the method 300 would distort the result and lower the accuracy, and P(go|<s>) or an alternative probability may be used (<s> represents a stop or pause at the beginning of a sentence). Similarly, in a modified 3-gram model, including P(to|hello bot go) in the speech recognition for the method 300 would distort the result and lower the accuracy, and P(to|go), P(to|<s>go), or an alternative probability may be used. This improvement may improve the overall accuracy of speech recognition by decoupling the key phrase from the first probability of any later dictionary phrase in the same phrase sequence. The language model may be trained with human conversations. Phrases like "hello bot go" and "hello bot go to" are uncommon and unlikely to have been used to train the language model. Thus, the language model may treat "hello bot go" and "hello bot go to" as ungrammatical and assign them each a low probability in speech recognition, lowering the overall probability score of a recognized sentence comprising "hello bot go" or "hello bot go to." Accordingly, despite that the individual phrases such as "go" and "to" may be spotted correctly in a phrase sequence, the entire sentence may still be filtered out in applying a language model as described below due to a low sentence probability score. By decoupling the key phrase from the first probability of any later dictionary phrase in the same phrase sequence, in other words, making any dictionary phrase's first probability independent of the key phrase, such problem can be at least mitigated.

In some embodiments, the above steps are applicable to a language model for speech recognition to modify and improve the language model, and the language model comprises a N-gram model. N may be a natural number larger than 1. As discussed earlier, the phrase sequence may start with the key phrase and comprise N−1 other dictionary phrases after the key phrase, the N−1 other dictionary phrases may comprise and end with a first dictionary phrase, and the first probability of the first dictionary phrase may depend on one or more dictionary phrases preceding the first dictionary phrase in the phrase sequence and not depend on the key phrase. For another example, the phrase sequence may start with the key phrase and comprise a second dictionary phrase after the key phrase, and the first probability of the second dictionary phrase may depend on starting a sentence with the second dictionary phrase and not depend on the key phrase.

In some embodiments, before obtaining the first probability, one or more components of the computing device 109 (e.g., the processor 119 and/or the memory 129) may, for the key phrase, obtain a second probability associated with starting the phrase sequence with the key phrase. The second probability (e.g., P(Hello bot|<s>)) may be larger than another probability of starting the phrase sequence with another dictionary phrase (e.g., P(go|<s>), P(subway|<s>), etc.). For example, P(Hello bot|<s>) may be set to 1, and P(go|<s>) and P(subway|<s>) are less than 1. For another example, in log computation of the probabilities, P(Hello bot|<s>) may be set to 0, and log P(Hello bot|<s>)=1; and P(go|<s>) and P(subway|<s>) may be negative. This improvement can also increase the overall probability score of the recognized sentence started with the key phrase. Thus, for situations where the key phrase is used as an awakening phrase to trigger some application or process while ignoring other speeches without association with the awakening phrase, this improvement based on the second probability can increase the accuracy for triggering.

In some embodiments, in applying the method 300, at step 302, an audio recording may be obtained, the audio recording comprising the key phrase and one or more dictionary phrases after the key phrase (e.g., "Hello bot, go to metro station"). For example, the audio may be submitted remotely from a mobile phone as captured from a microphone.

At step 304, an acoustic model may be applied to the audio recording to recognize the key phrase and determine one or more candidate dictionary phrases. The key phrase and the one or more dictionary phrases may be associated with a linguistic model, each linguistic model associating the phrase with one or more pronunciation elements of the phrase. As discussed earlier, the acoustic model may be trained to represent the relationship between the audio of a speech and phonemes or other linguistic units that make up the speech. The start and end for each phoneme in the audio may be dynamically determined and features (e.g., character vectors) may be extracted from the audio to generate speech fingerprints (e.g., <s>hh-a-I-ou<pau>b-o-t<pau>g-ou<pau>t-o<pau>m-e-tr-ou<pau>ss-t-ei-sh-ion</s>, where <pau> represents a pause). The phonemes are exemplary and may be modified in various ways. The machine may compare the generated speech fingerprints with a phrase fingerprint template (e.g., template 301) to select the most matching phonemes. For example, "hh" in 304 matched with "hh" in template 301. The feedback loop for the template 301 may represent a looped search for the most matching phonemes. Alternative to the loop algorithm, other search methods such as a graph search may be used. Each group of determined phonemes between pauses may be checked against a pronunciation dictionary to determine the key phrase and one or more candidate dictionary phrases corresponding to the speech in the audio. The pronunciation dictionary may be a part of the phrase fingerprint template. Accordingly, a number of phrase sequences may be obtained as candidate sequences, such as <s>Hello<pau>bot<pau>go<pau>to<pau>metro<pau>station</s>, <s>Hello<pau>bought<pau>goat<pau>too<pau>metro<pau>station</s>, etc.

At step 306, the one or more dictionary phrases may be determined, in a temporal order in the audio recording, from the one or more candidate dictionary phrases based at least on the language model. As discussed above with reference to the first and second probabilities, the phrase sequence of the highest probability score may be used as a recognized speech of the audio recording, and the described first and second probabilities can improve the accuracy of the recognition. The dictionary to which the key phrase is added to may be a dictionary 303. The feedback loop for the dictionary 303 may represent a looped search for the most fitting phrases in a sequence of phrases. The looped dictionary and the various associated probabilities (e.g., the first and second probabilities) in a phrase sequence may be a part of the sentence fingerprint template described earlier. Alternative to the loop algorithm, other search methods such as a graph search may be used.

Figure 3B:
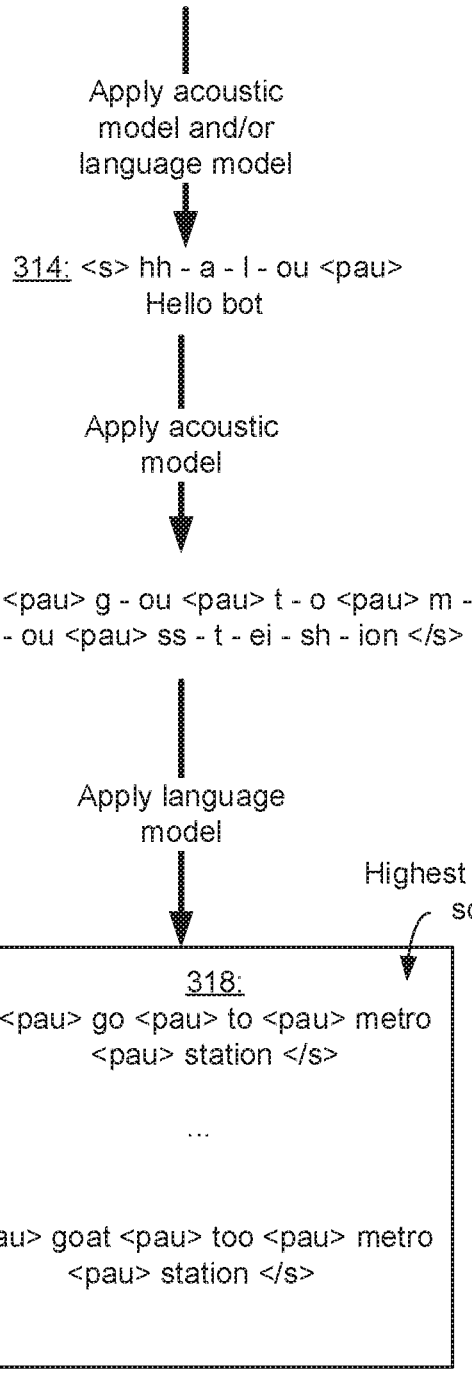
Figure 3B:
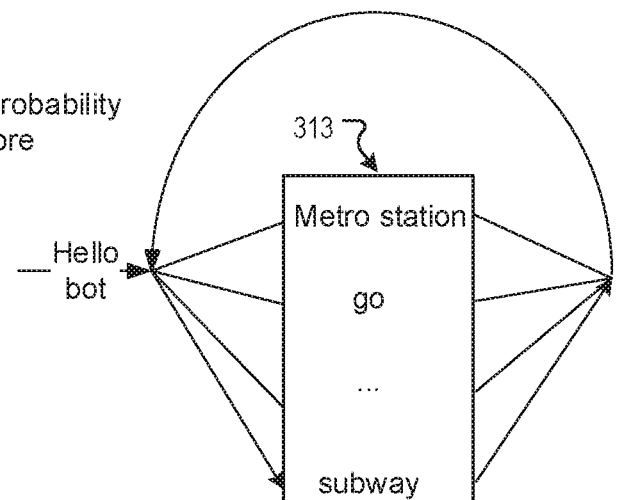

FIG. 3B illustrates an example method 310 for speech recognition, in accordance with various embodiments. The method 310 may be implemented in various environments including, for example, the environment 100 of FIG. 1. The various steps discussed with reference to FIG. 3B may be implemented by one or more components of the computing device 109 (e.g., the processor 119 and/or the memory 129). The description of FIG. 3B is intended to be illustrative and may be modified in various ways according to the implementation. For FIG. 3B, "hello bot" is assumed to be the key phrase.

The method 310 is mostly similar to the method 300 described above. The main differences include that the key phrase is separately recognized and has to be recognized before the recognition of the query following the key phrase. At step 312, the audio recording may be obtained. At step 314, a linguistic model and/or a language model may be applied to recognize the key phrase "hello bot." The linguistic model may include phonemes for "hello bot," and the language model may include P(hello bot|<s>). Once the key phrase is recognized, at step 316, an acoustic model and a language model may be applied to recognize the query similar to the N-gram model. Here, the key phrase is not included in the dictionary 313, and is assigned a significant weight to increase the probability score of a phrase sequence started with the key phrase. Thus, only when first obtaining the key phrase, the following phrase sequence in the query can be loop-searched in the dictionary 313 based on the language model and be accurately recognized. FIG. 3B may be an alternative solution to FIG. 3A, but the rest of the description of speech recognition in this disclosure may be assumed to correspond to FIG. 3A.

Figure 4:
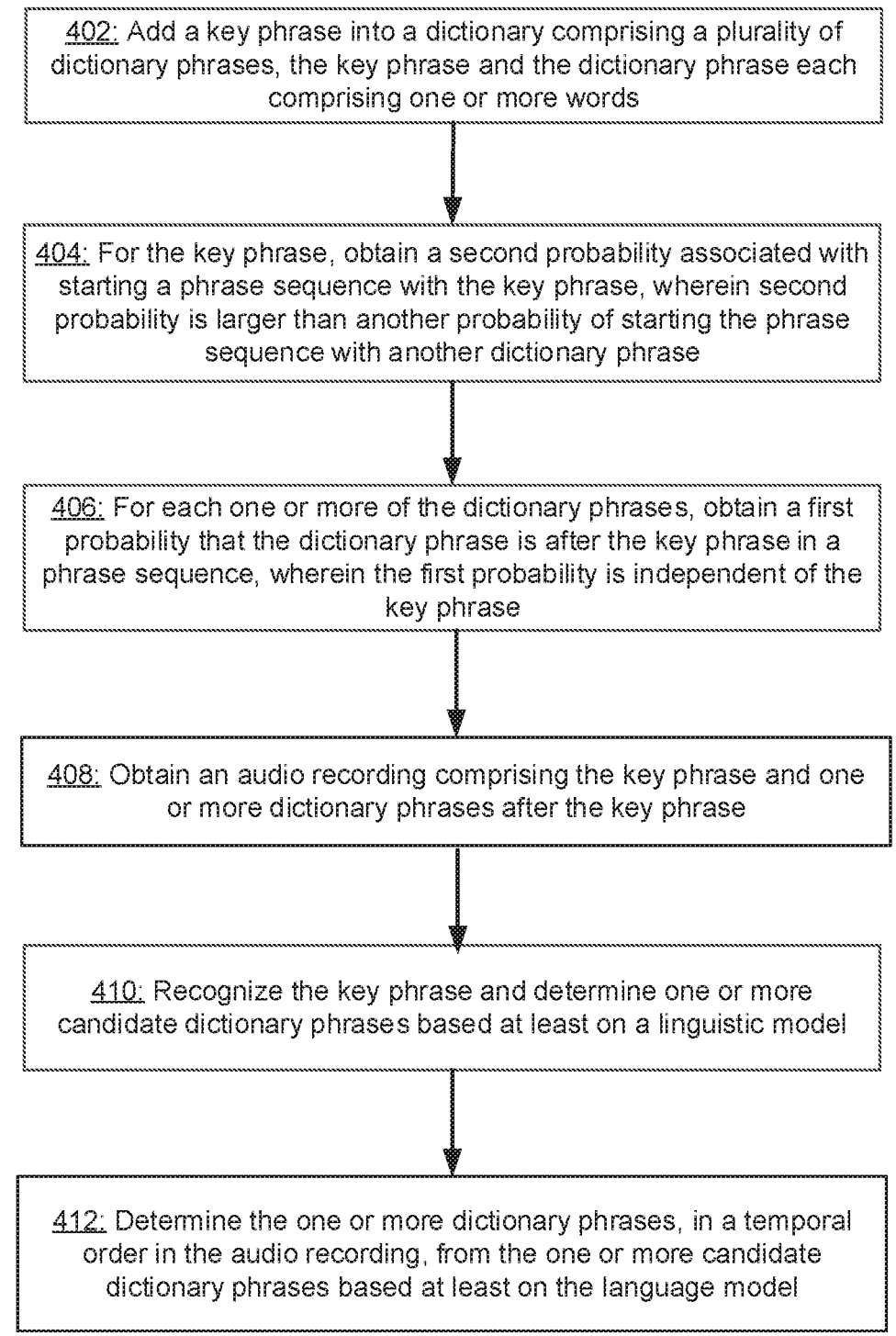
FIG. 4 illustrates a flowchart of an example method for speech recognition, in accordance with various embodiments.

FIG. 4 illustrates a flowchart of an example method 400, according to various embodiments of the present disclosure. The method 400 may be implemented in various environments including, for example, the environment 100 of FIG. 1. The example method 400 may be implemented by one or more components of the computing device 109 (e.g., the processor 119 and/or the memory 129). The example method 400 may be implemented by one or more speech recognition systems similar to the computing device 109. The operations of method 400 presented below are intended to be illustrative. Depending on the implementation, the example method 400 may include additional, fewer, or alternative steps performed in various orders or in parallel. One or more steps of the method 400 may be optional, such as blocks 404 and 408-412.

At block 402, a preset key phrase may be added to a dictionary comprising a plurality of dictionary phrases, the key phrase and the dictionary phrase each comprising one or more words. The dictionary may be stored in the memory 129 or otherwise accessible to the computing device 109. At block 404, optionally, for the key phrase, a second probability associated with starting a phrase sequence with the key phrase may be obtained. The second probability may be larger than another probability of starting the phrase sequence with another dictionary phrase. At block 406, for each one or more of the dictionary phrases, a first probability that the dictionary phrase is after the key phrase in a phrase sequence may be obtained. The first probability may be independent of the key phrase. The phrase sequences in the block 404 and the block 406 may be the same or different. At block 408, optionally, an audio recording comprising the key phrase and one or more dictionary phrases after the key phrase may be obtained. At block 410, the key phrase may be recognized based at least on a linguistic model and one or more candidate dictionary phrases may be determined based at least on the linguistic model. The linguistic model is described above with reference to FIGS. 3A-3B. At block 412, the one or more dictionary phrases may be determined, in a temporal order in the audio recording, from the one or more candidate dictionary phrases based at least on the language model.

The techniques described herein are implemented by one or more special-purpose computing devices. The special-purpose computing devices may include one or more hardware processors programmed to perform the techniques pursuant to program instructions in firmware, memory, other storage, or a combination. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
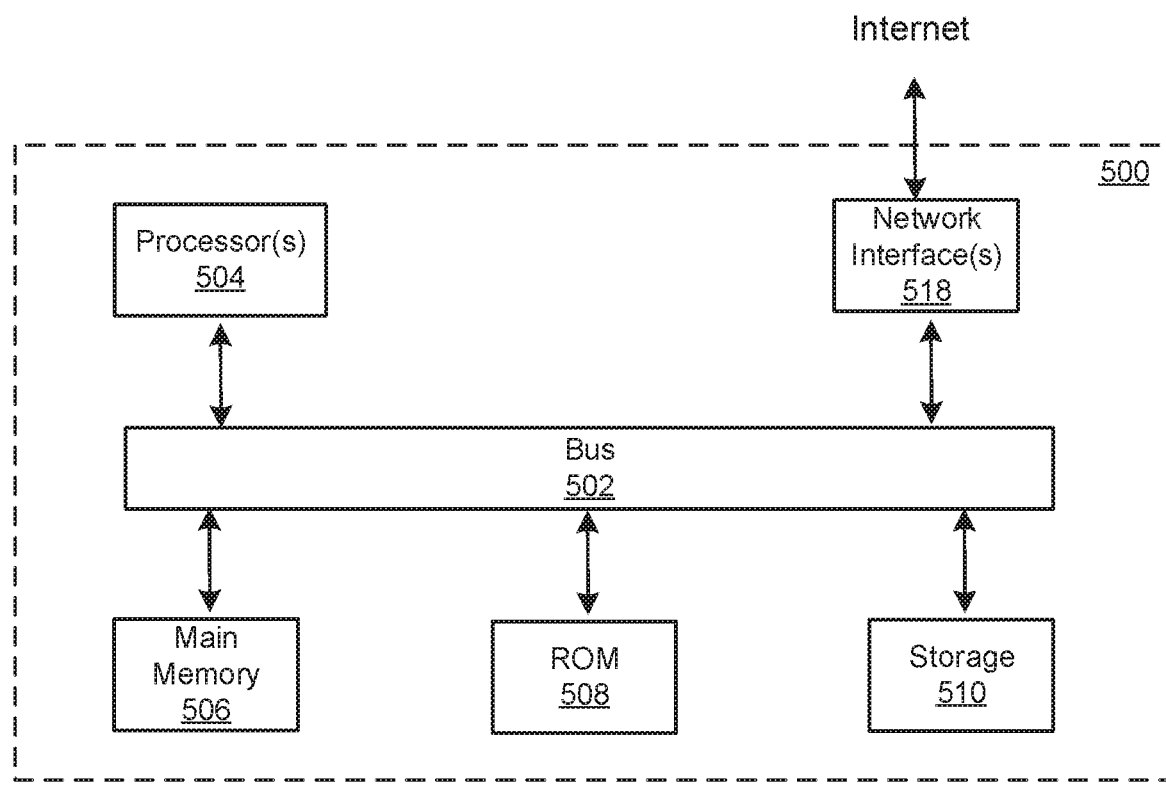
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the computing device 109 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 119 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 129 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A speech recognition method, implementable by a server including a processor and a non-transitory computer-readable storage medium for speech recognition, the method comprising:
adding a key phrase into a dictionary comprising a plurality of dictionary phrases;
training a language model to generate:
for each of the plurality of dictionary phrases, a first probability of the dictionary phrase following another dictionary phrase, a stop, or a pause in a phrase sequence, wherein the first probability is independent of the key phrase, and
for the key phrase, a second probability of starting the phrase sequence with the key phrase, wherein the second probability is larger than another probability of starting the phrase sequence with any of the plurality of dictionary phrases; and
identifying, from an audio recording, one or more of the plurality of dictionary phrases and the key phrase based at least on the first probabilities and the second probability generated by the trained language model.

2. The speech recognition method of claim 1, wherein: the language model comprises an N-gram model.

3. The speech recognition method of claim 2, wherein: N is a natural number larger than 1.

4. The speech recognition method of claim 2, wherein: the phrase sequence starts with the key phrase and comprises N−1 of the plurality of dictionary phrases after the key phrase;
the N−1 of the plurality of dictionary phrases comprise and end with a first dictionary phrase; and
the first probability of the first dictionary phrase depends on one or more dictionary phrases preceding the first dictionary phrase in the phrase sequence and does not depend on the key phrase.

5. The speech recognition method of claim 2, wherein: the phrase sequence starts with the key phrase and comprises a second dictionary phrase after the key phrase; and
the first probability of the second dictionary phrase depends on starting a sentence with the second dictionary phrase and does not depend on the key phrase.

6. The speech recognition method of claim 1, wherein: the key phrase and the plurality of dictionary phrases are associated with a linguistic model, wherein the linguistic model associates each phrase of the key phrase and the plurality of dictionary phrases with one or more pronunciation elements of the phrase.

7. The speech recognition method of claim 6, wherein the identifying the key phrase and one or more of the dictionary phrases from an obtained audio recording comprises:
obtaining one or more candidate phrase sequences from the obtained audio recording based at least on the linguistic model; and
determining one sequence of the one or more candidate phrase sequences as a recognized speech of the obtained audio recording, wherein the determined sequence has a highest probability according to the language model.

8. The speech recognition method of claim 6, wherein: for each of the key phrase and the plurality of dictionary phrases, the pronunciation elements comprise one or more phonemes.

9. A computing system for speech recognition, comprising: a processor; and a non-transitory computer-readable storage medium storing instructions that, when executed by the processor, cause the processor to:
add a key phrase into a dictionary comprising a plurality of dictionary phrases;
train a language model to generate:
for each of the plurality of dictionary phrases, a first probability of the dictionary phrase following another dictionary phrase, a stop, or a pause in a phrase sequence, wherein the first probability is independent of the key phrase, and
for the key phrase, a second probability of starting the phrase sequence with the key phrase, wherein the second probability is larger than another probability of starting the phrase sequence with any of the plurality of dictionary phrases; and
identify, from an audio recording, one or more of the plurality of dictionary phrases and the key phrase based at least on the first probabilities and the second probability generated by the trained language model.

10. The speech recognition system of claim 9, wherein: the language model comprises an N-gram model.

11. The speech recognition system of claim 10, wherein: N is a natural number larger than 1.

12. The speech recognition system of claim 10, wherein: the phrase sequence starts with the key phrase and comprises N−1 of the plurality of dictionary phrases after the key phrase;
the N−1 of the plurality of dictionary phrases comprise and end with a first dictionary phrase; and
the first probability of the first dictionary phrase depends on one or more dictionary phrases preceding the first dictionary phrase in the phrase sequence and does not depend on the key phrase.

13. The speech recognition system of claim 10, wherein: the phrase sequence starts with the key phrase and comprises a second dictionary phrase after the key phrase; and
the first probability of the second dictionary phrase depends on starting a sentence with the second dictionary phrase and does not depend on the key phrase.

14. The speech recognition system of claim 9 wherein: the key phrase and the plurality of dictionary phrases are associated with a linguistic model, wherein the linguistic model associates each phrase of the key phrase and the plurality of dictionary phrases with one or more pronunciation elements of the phrase.

15. The speech recognition system of claim 14, wherein the processor is caused to:
   obtain one or more candidate phrase sequences from the obtained audio recording based at least on the linguistic model; and
   determine one sequence of the one or more candidate phrase sequences as a recognized speech of the obtained audio recording, wherein the determined sequence has a highest probability according to the language model.

16. The speech recognition system of claim 14, wherein:
for each of the key phrase and the plurality of dictionary phrases, the pronunciation elements comprise one or more phonemes.

17. A non-transitory computer-readable storage medium storing instructions that, when executed by a processor, cause the processor to a method, the method comprising:
   adding a key phrase into a dictionary comprising a plurality of dictionary phrases;
   training a language model to generate:
      for each of the plurality of dictionary phrases, a first probability of the dictionary phrase following another dictionary phrase, a stop, or a pause in a phrase sequence, wherein the first probability is independent of the key phrase, and
      for the key phrase, a second probability of starting the phrase sequence with the key phrase, wherein the second probability is larger than another probability of starting the phrase sequence with any of the plurality of dictionary phrases; and
   identifying, from an audio recording, one or more of the plurality of dictionary phrases and the key phrase based at least on the first probabilities and the second probability generated by the trained language model.

18. The non-transitory computer-readable storage medium of claim 17, wherein:
   the language model comprises an N-gram model.

19. The speech recognition method of claim 1, wherein the training a language model comprises: training the language model with human conversations to generate probabilities for phrases in speech recognition, and decoupling the key phrase and any later dictionary phrase in the phrase sequence.

* * * * *